US012754508B2

(12) United States Patent
Ishihara

(10) Patent No.: US 12,754,508 B2
(45) Date of Patent: Oct. 6, 2026

(54) IMAGE FORMING APPARATUS THAT DETECTS PRESENCE OF SHEET ON TRANSPORT ROUTE, AND POSTURE OF BRANCH GUIDE, WITH SINGLE SENSOR

(71) Applicant: KYOCERA Document Solutions Inc., Osaka (JP)

(72) Inventor: Yoshiaki Ishihara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/074,775

(22) Filed: Mar. 10, 2025

(65) Prior Publication Data

US 2025/0284236 A1 Sep. 11, 2025

(30) Foreign Application Priority Data

Mar. 11, 2024 (JP) ................................ 2024-037363

(51) Int. Cl.
*G03G 15/00* (2006.01)

(52) U.S. Cl.
CPC ......... *G03G 15/70* (2013.01); *G03G 15/5016* (2013.01); *G03G 15/657* (2013.01); *G03G 2215/00548* (2013.01)

(58) Field of Classification Search
CPC .. G03G 15/70; G03G 15/5016; G03G 15/657; G03G 2215/00548
See application file for complete search history.

(56) References Cited

U.S. PATENT DOCUMENTS 7,942,416 B2 * 5/2011 Muratani ........... G03G 15/6579 271/301
2003/0057641 A1 3/2003 Yamada et al.
2009/0243199 A1 10/2009 Daigo et al.
2014/0320873 A1 * 10/2014 Kato .................. H04N 1/00578 358/1.12
2020/0031149 A1 * 1/2020 Yoshida ............. H04N 1/00469
2024/0176273 A1 * 5/2024 Tanio ..................... B65H 85/00

FOREIGN PATENT DOCUMENTS

JP 2004-035148 A 2/2004

* cited by examiner

*Primary Examiner* — David H Banh
(74) *Attorney, Agent, or Firm* — IP Business Solutions, LLC.

(57) ABSTRACT

An image forming apparatus includes an image forming device; a fixing device; a first transport route; a second transport route; a branch guide that assumes a first posture and a second posture; a sheet contact member that assumes a non-contact posture and a contacting posture; a detection object that assumes a first posture, when the branch guide assumes the first posture and when the sheet contact member assumes the non-contact posture, and assumes a second posture, when the branch guide assumes the second posture and when the sheet contact member assumes the contacting posture; and a sensor that outputs a first signal, when the detection object is in the first posture, and outputs a second signal, when the detection object is in the second posture.

4 Claims, 6 Drawing Sheets

IMAGE FORMING APPARATUS THAT DETECTS PRESENCE OF SHEET ON TRANSPORT ROUTE, AND POSTURE OF BRANCH GUIDE, WITH SINGLE SENSOR

INCORPORATION BY REFERENCE

This application claims priority to Japanese Patent Application No. 2024-037363 filed on Mar. 11, 2024, the entire contents of which are incorporated by reference herein.

BACKGROUND

The present disclosure relates to an image forming apparatus, and in particular to a technique to detect occurrence of sheet jam and a posture of a branch guide.

In relation to existing image forming apparatuses, some techniques to detect occurrence of sheet jam, and the posture of a branch guide, are known. An example of such techniques includes deciding, when the sheet jam is detected, whether a branch guide plate is located at the home position, displaying a message to the effect that the jam has occurred, when the branch guide plate is located at the home position, and displaying, when the branch guide plate is not located at the home position, the message to the effect that the jam has occurred, after locating the branch guide plate at the home position.

SUMMARY

The disclosure proposes further improvement of the foregoing technique.

In an aspect, the disclosure provides an image forming apparatus including an image forming device, a fixing device, a first transport route, a second transport route, a branch guide, a sheet contact member, a detection object, and a sensor. The image forming device forms an image on a sheet. The fixing device fixes the image onto the sheet. The first transport route extends from the fixing device to a delivery port. The second transport route is branched from the first transport route, and extends toward the image forming device. The branch guide assumes a first guide posture, to guide the sheet to the first transport route, and assumes a second guide posture, to guide the sheet to the second transport route. The sheet contact member assumes a non-contact posture, when not in contact with the sheet on the first transport route, and assumes a contacting posture, when in contact with the sheet on the first transport route. The detection object assumes a first detection posture, when the branch guide assumes the first guide posture, assumes a second detection posture, when the branch guide assumes the second guide posture, assumes the first detection posture, when the sheet contact member assumes the non-contact posture, and assumes the second detection posture, when the sheet contact member assumes the contacting posture. The sensor outputs a first signal, when the detection object is in the first detection posture, and outputs a second signal, when the detection object is in the second detection posture.

DETAILED DESCRIPTION

Figure 1:
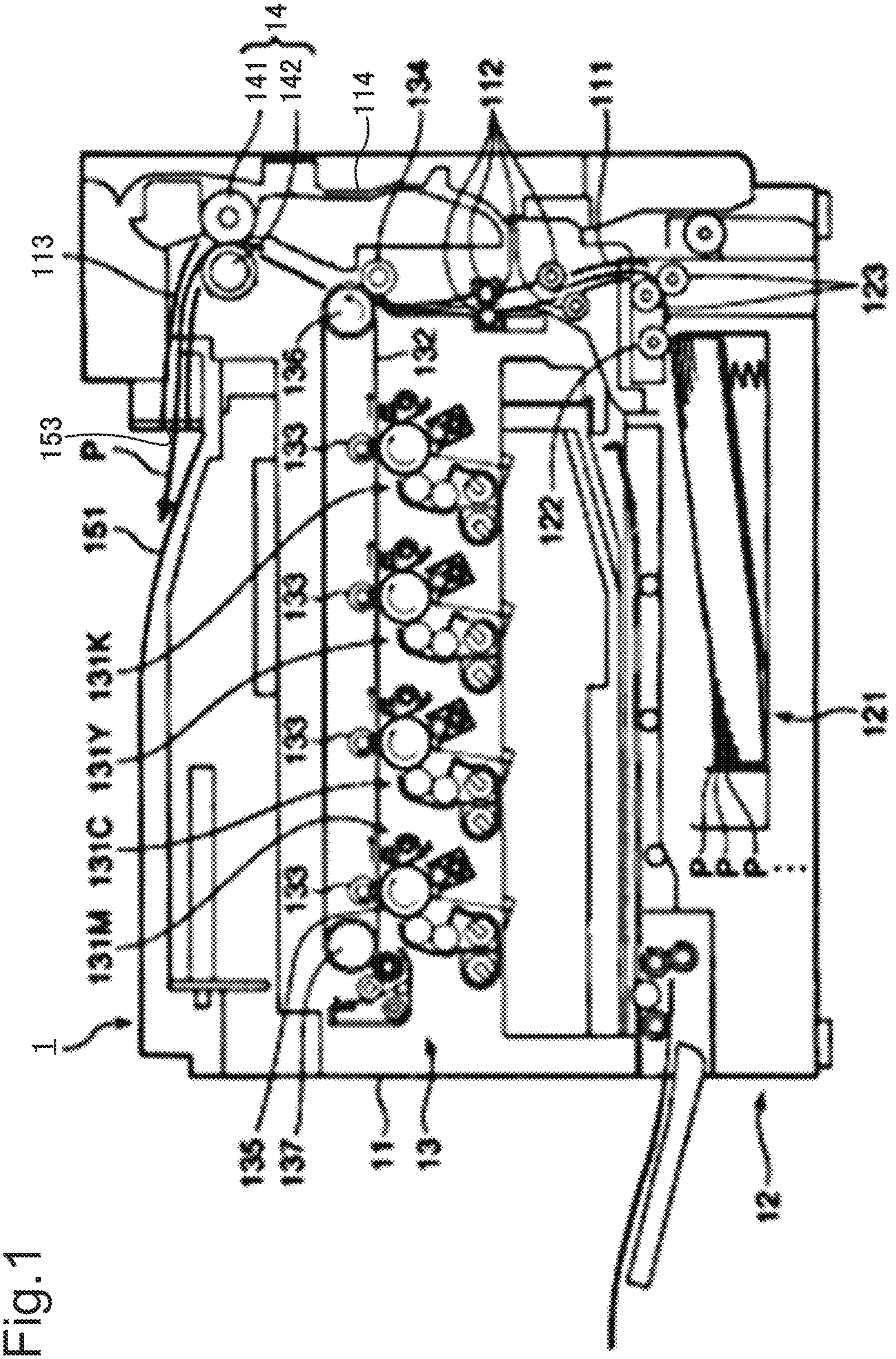
FIG. 1 is a schematic cross-sectional view showing a structure of an image forming apparatus.
Figure 2:
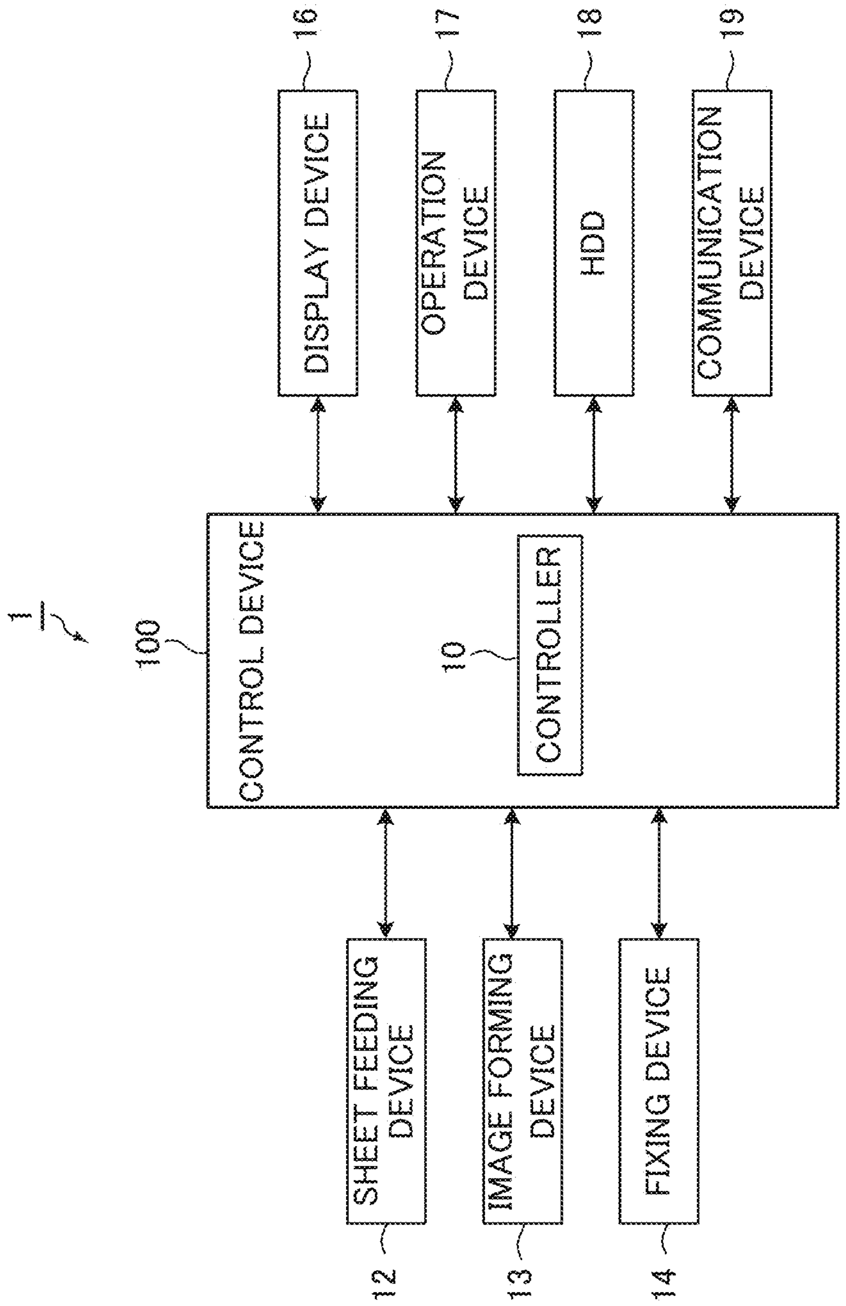
FIG. 2 is a block diagram showing a configuration of the image forming apparatus.
Figure 3:
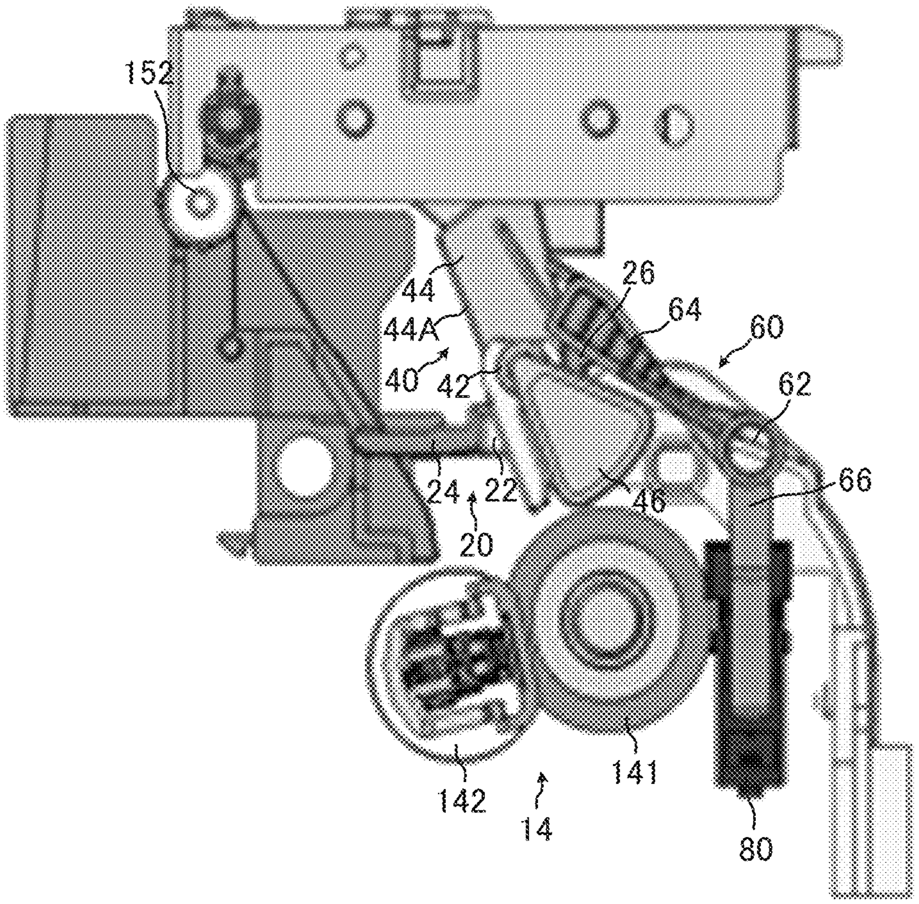
FIG. 3 is a partially enlarged front view showing a fixing device and related parts.
Figure 4:
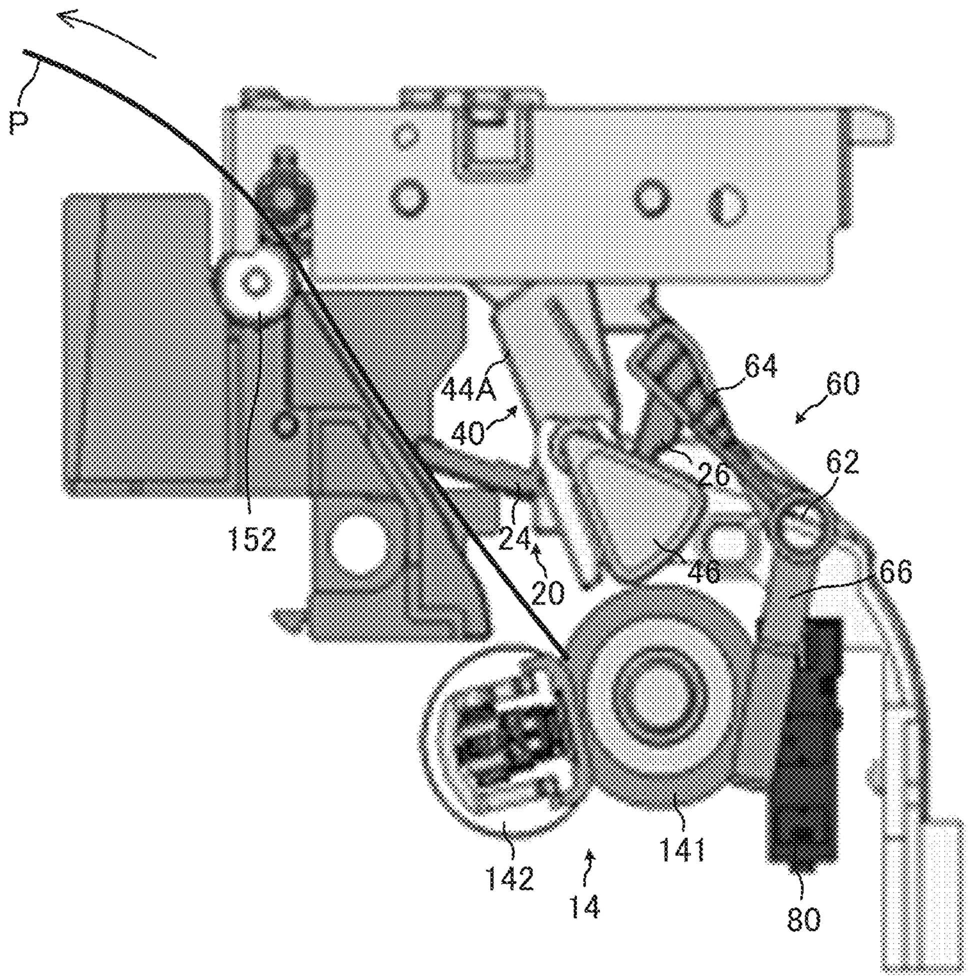
FIG. 4 is a partially enlarged front view showing the fixing device and the related parts.
Figure 5:
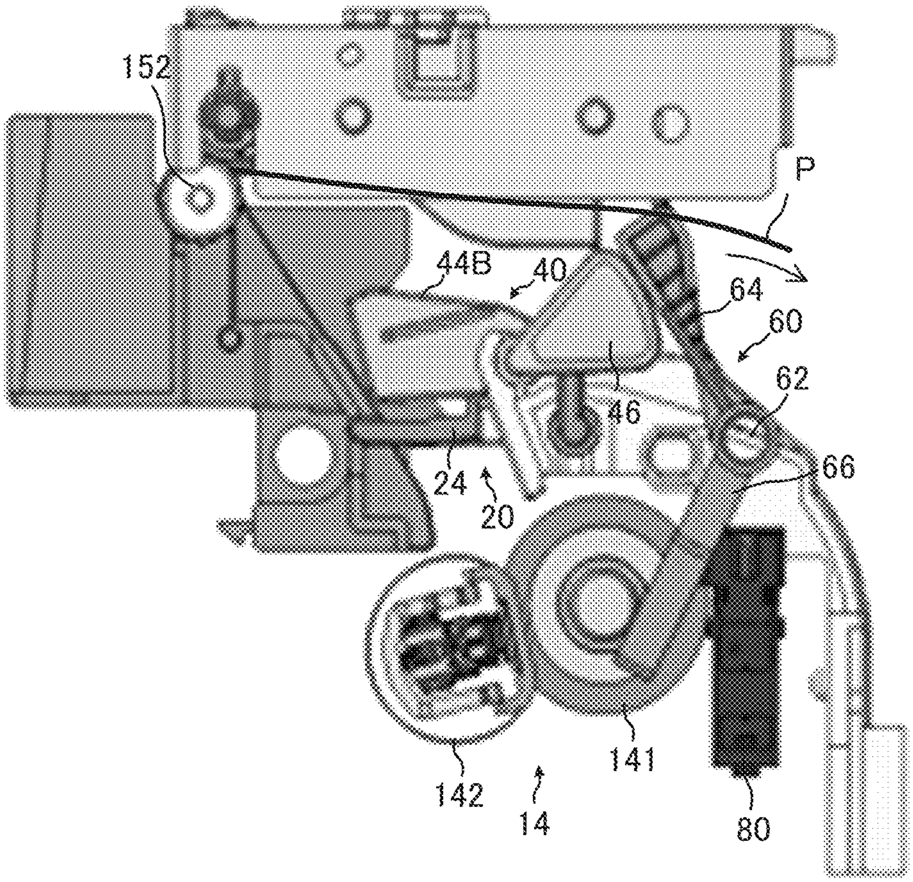
FIG. 5 is a partially enlarged front view showing the fixing device and the related parts.

Hereafter, an image forming apparatus according to an embodiment of the disclosure will be described, with reference to the drawings. FIG. 1 is a schematic cross-sectional view showing a structure of the image forming apparatus 1 according to the embodiment of the disclosure. FIG. 2 is a block diagram showing a configuration of the image forming apparatus 1. FIG. 3 to FIG. 5 are partially enlarged front views each showing a fixing device 14 and related parts, installed in the image forming apparatus 1.

Configuration of Apparatus

As shown in FIG. 1, the image forming apparatus 1 is a tandem-type color printer. In a casing 11 of the image forming apparatus 1, a sheet feeding device 12, an image forming device 13, and a fixing device 14 are accommodated.

Inside the casing 11, a sheet transport route 111 is provided that extends from the sheet feeding device 12 to the fixing device 14, via the image forming device 13. A plurality of transport roller pairs 112 are provided, at predetermined positions along the sheet transport route 111. The transport roller pairs 112 each serve to transport a sheet P along the sheet transport route 111.

The casing 11 further includes therein a first transport route 113 extending from the fixing device 14 to a delivery port 153, and a second transport route 114 branched from the first transport route 113, and merging with the sheet transport route 111 at a position upstream of the image forming device 13 in a sheet transport direction.

The sheet feeding device 12 includes a sheet feeding tray 121, a pickup roller 122, and a sheet feeding roller pair 123. The pickup roller 122 draws out the sheets P stored in the sheet feeding tray 121, one by one. The sheet feeding roller pair 123 delivers the sheet P drawn out by the pickup roller 122, to the sheet transport route 111.

The image forming device 13 forms an image, constituted of a toner image, on the sheet P. The image forming device 13 includes image forming units 131M, 131C, 131Y, and 131K, an intermediate transfer belt 132, a primary transfer roller 133, and a secondary transfer roller 134.

The image forming units 131M, 131C, 131Y, and 131K respectively correspond to magenta, cyan, yellow, and black colors. The image forming units 131M, 131C, 131Y, and 131K each include a photoconductor drum 135, so that the toner image is formed thereon, through charging, exposing, developing, and transferring processes, using developing agents respectively corresponding to the mentioned colors.

The intermediate transfer belt 132 is stretched around a drive roller 136 and a follower roller 137. The intermediate transfer belt 132 is made to revolve, by the rotating motion of the drive roller 136. The follower roller 137 is made to rotate, by the revolving motion of the intermediate transfer belt 132.

The primary transfer roller 133 is located so as to oppose one of the photoconductor drums 135, via the intermediate transfer belt 132. The primary transfer roller 133 is made to rotate, by the revolving motion of the intermediate transfer belt 132. The primary transfer roller 133 transfers the toner image formed on the photoconductor drum 135 to the intermediate transfer belt 132, as primary transfer.

The secondary transfer roller 134 transfers the toner image on the intermediate transfer belt 132 to the sheet P delivered from the sheet feeding device 12, as secondary transfer. The secondary transfer roller 134 is located so as to oppose the drive roller 136, via the intermediate transfer belt 132. The secondary transfer roller 134 is made to rotate, by the revolving motion of the intermediate transfer belt 132.

The fixing device 14 includes a pressure roller 141 and a fixing roller 142. The pressure roller 141 is made to rotate about the axial line, by the driving force of a drive motor. The fixing roller 142 includes a fixing belt and a heater. The fixing belt is a generally cylindrical endless belt, rotatably supported by a shaft. The heater is provided inside the fixing belt, in contact with the inner circumferential surface of the fixing belt.

The fixing roller 142 is pressed against the pressure roller 141 by a pressing member, so as to define a nip region. The fixing roller 142 is made to rotate by the rotating motion of the pressure roller 141, in pressure-contact therewith. The fixing device 14 heats and presses the sheet P, having the toner image transferred thereto, through the nip region, thereby fixing the toner image onto the sheet P. As result, a full-color image is formed on the sheet P.

The image forming apparatus 1 further includes an output tray 151, and a delivery roller 152 shown in FIG. 3. The delivery roller 152 is made to rotate about the axial line, by the driving force of the drive motor. In this embodiment, the pressure roller 141 and the delivery roller 152 are connected to the same drive motor. The delivery roller 152 delivers the sheet P on which the full-color image has been formed, to the output tray 151 through the delivery port 153.

The sheet P having the full-color image formed thereon is delivered to either of the first transport route 113 and the second transport route 114, by a branch guide 40 shown in FIG. 3. For example, when the image is formed only on one face of the sheet P, the branch guide 40 guides the sheet P that has passed the fixing device 14 to the first transport route 113, so that the delivery roller 152 delivers the sheet P to the output tray 151.

On the other hand, when the image is formed on both faces of the sheet P, the branch guide 40 once guides the sheet P that has passed the fixing device 14, with an image formed on one face, to the first transport route 113, so that the delivery roller 152 discharges a part of the sheet P to outside of the apparatus. Then, when the delivery roller 152 rotates reversely so that the sheet P is switched back, the branch guide 40 guides the sheet P to the second transport route 114, and feeds the sheet P toward the merging point with the sheet transport route 111. The image forming device 13 forms an image on the back face of the sheet P, transported along the sheet transport route 111. The branch guide 40 guides the sheet P that has again passed the fixing device 14 to the first transport route 113, so that the delivery roller 152 delivers the sheet P to the output tray 151.

Referring to FIG. 2, the image forming apparatus 1 includes a control device 100. The control device 100 includes a processor, a random-access memory (RAM), and a read-only memory (ROM). The processor is, for example, a central processing unit (CPU), a micro processing unit (MPU), or an application-specific integrated circuit (ASIC).

The control device 100 is electrically connected to the sheet feeding device 12, the image forming device 13, the fixing device 14, a display device 16, an operation device 17, a hard disk drive (HDD) 18, and a communication device 19. The control device 100 acts as a controller 10, when the processor executes the computer programs stored in the built-in ROM or HDD 18.

The controller 10 controls the overall operation of the image forming apparatus 1. Here, the controller 10 may be constituted in the form of a logic circuit, instead of being realized by the operation according to the computer program, or constituted of two or more control devices.

The display device 16 is, for example, constituted of an LCD or an organic light-emitting diode (OLED) display. The display device 16 displays various types of screen related to the functions that the image forming apparatus 1 is configured to perform.

The operation device 17 includes a plurality of hard keys. The operation device 17 also includes a touch panel overlaid on the display device 16. The operation device 17 receives an instruction from the user. The operation device 17 may also include soft keys displayed on the display device 16.

The HDD 18 contains the computer programs for realizing the functions of the image forming apparatus 1. In this embodiment, the HDD 18 contains a detection program for executing an abnormality detection process.

The communication device 19 includes a communication module such as a local area network (LAN) board. The controller 10 performs data communication through the communication device 19, with an external device such as a personal computer (PC) connected via a network.

A power source is connected to each of the components of the image forming apparatus 1. When the user turns the power on, the power is supplied to those components from the power source.

Referring now to FIG. 3 to FIG. 5, the configuration of the fixing device 14 and the related parts will be described in detail. FIG. 3 illustrates the state before the image forming operation, FIG. 4 illustrates the state where the sheet P is being delivered to the first transport route 113, and FIG. 5 illustrates the state where the sheet P is being delivered to the second transport route 114.

As shown in FIG. 3, the image forming apparatus 1 includes an actuator 20, the branch guide 40, a lever 60, and a sensor 80, which are provided around the fixing device 14.

The actuator 20 includes a rotation shaft 22, a first contact piece 24, and a second contact piece 26. The rotation shaft 22 is rotatably supported, at a position on the upper side of the fixing device 14. The first contact piece 24 is projecting from the rotation shaft 22, in the direction orthogonal to the axial direction thereof. The second contact piece 26 is projecting from the rotation shaft 22, in the direction orthogonal to the axial direction thereof, but different from the projecting direction of the first contact piece 24 (in this case, approximately 120° from the first contact piece 24, clockwise in FIG. 3).

The actuator 20 is a sheet contact member, configured to assume a non-contact posture, when not in contact with the sheet P on the first transport route 113, and assume a contacting posture when in contact with the sheet P on the first transport route 113. To be more specific, when the sheet P is not present on the first transport route 113, the actuator 20 assumes the non-contact posture, in which the first contact piece 24 is present on the first transport route 113, as shown in FIG. 3 and FIG. 5. When the sheet P is present on the first transport route 113, the first contact piece 24 makes contact with the sheet P on the first transport route 113 as shown in FIG. 4, and therefore the actuator 20 rotates clockwise in FIG. 4 about the rotation shaft 22, thereby assuming the contacting posture.

The branch guide 40 includes a rotation shaft 42, a guide member 44, and a contact member 46. The rotation shaft 42 is rotatably supported, at a position on the upper side of the fixing device 14. The guide member 44 is projecting from the rotation shaft 42, such that the longitudinal direction of the guide member 44 is aligned with the axial direction of the rotation shaft 42. The contact member 46 is projecting from the rotation shaft 42, in the direction orthogonal to the axial direction of the rotation shaft 42, but different from the projecting direction of the guide member 44 from the rotation shaft 42 (in this case, approximately 180° from the guide member 44, counterclockwise in FIG. 3).

To guide the sheet P to the first transport route 113, the branch guide 40 assumes a first guide posture, in which a first face 44A of the guide member 44 forms a part of the first transport route 113, as shown in FIG. 3 and FIG. 4. To guide the sheet P to the second transport route 114, the branch guide 40 assumes a second guide posture, in which a second face 44B of the guide member 44, on the opposite side of the first face 44A, forms a part of the second transport route 114, as shown in FIG. 5.

To shift the branch guide 40 from the first guide posture to the second guide posture, the controller 10 operates a solenoid provided in the branch guide 40 in the forward direction, for a predetermined moving time (in this case, 120 msec), thereby rotating the branch guide 40 counterclockwise in FIG. 3 to FIG. 5, about the rotation shaft 42.

The lever 60 includes a rotation shaft 62, a contact piece 64, and a detection piece 66 serving as a detection object. The rotation shaft 62 is rotatably supported at a position beside the fixing device 14. The contact piece 64 is projecting from the rotation shaft 62, in a direction orthogonal to the axial direction thereof. The detection piece 66 is projecting from the rotation shaft 62, in the direction orthogonal to the axial direction thereof, but different from the projecting direction of the contact piece 64 (in this case, approximately 120° from the contact piece 64, counterclockwise in FIG. 3).

When the branch guide 40 assumes the first guide posture, the lever 60 assumes a first detection posture, in which the contact member 46 of the branch guide 40 is not in contact with the contact piece 64 of the lever 60, as shown in FIG. 3 and FIG. 4. When the branch guide 40 assumes the second guide posture, the contact member 46 of the branch guide 40 makes contact with the contact piece 64 of the lever 60, because of the counterclockwise rotation of the branch guide 40, so that the lever 60 rotates clockwise about the rotation shaft 62, thereby assuming the second detection posture, as shown in FIG. 5.

When the actuator 20 assumes the non-contact posture, the lever 60 assumes the first detection posture, in which the second contact piece 26 of the actuator 20 is in contact with the contact piece 64 of the lever 60, as shown in FIG. 3. When the actuator 20 assumes the contacting posture, the second contact piece 26 of the actuator 20 presses the contact piece 64 of the lever 60, because of the clockwise rotation of the actuator 20, so that the lever 60 rotates clockwise about the rotation shaft 62, thereby assuming the second detection posture, as shown in FIG. 4.

The sensor 80 is a photosensor for sensing the detection piece 66 of the lever 60, and includes a light emitter and a photodetector opposed to each other. The sensor 80 outputs an OFF signal (first signal), when the lever 60 is in the first detection posture, in which the detection piece 66 of the lever 60 is located at the light-shielding position, in other words between the light emitter and the photodetector, as shown in FIG. 3.

The sensor 80 outputs an ON signal (second signal), when the lever 60 is in the second detection posture, in which the detection piece 66 of the lever 60 is located at a light-transmitting position, in other words a position deviated from between the light emitter and the photodetector, as shown in FIG. 4 and FIG. 5.

As described above, when the actuator 20 assumes the non-contact posture, and the branch guide 40 assumes the first guide posture, as shown in FIG. 3, the sensor 80 outputs the OFF signal. In contrast, when the actuator 20 assumes the contacting posture as shown in FIG. 4, or when the branch guide 40 assumes the second guide posture as shown in FIG. 5, the sensor 80 outputs the ON signal.

Thus, according to this embodiment, when the sensor 80 is outputting the ON signal, it can be presumed that, in the image forming apparatus 1, the sheet P is present on the first transport route 113, or the branch guide 40 is in the second guide posture.

Here, in the case where the image forming apparatus 1 is normally operating before the image forming by the image forming device 13 (e.g., during a warm-up phase), the actuator 20 assumes the non-contact posture and the branch guide 40 assumes the first guide posture, and therefore the sensor 80 outputs the OFF signal (first signal). Accordingly, when the sensor 80 outputs the ON signal before the image forming by the image forming device 13, which indicates that abnormality has occurred inside the image forming apparatus 1, it is necessary to identify the reason that the sensor 80 is outputting the ON signal.

In this embodiment, therefore, the controller 10 executes an abnormality detection process, by operating according to the detection program, when the sensor 80 is outputting the ON signal before the image forming by the image forming device 13. The abnormality detection process includes causing the branch guide 40 to shift from the second guide posture to the first guide posture, causing the display device 16 to display a notification screen indicating that the sheet P is located on the first transport route 113, when the sensor 80 is still outputting the ON signal after the branch guide 40 has shifted the posture, and keeping from causing the display device 16 to display the notification screen, when the sensor 80 outputs the OFF signal after the branch guide 40 has shifted the posture.

Operation

Figure 6:
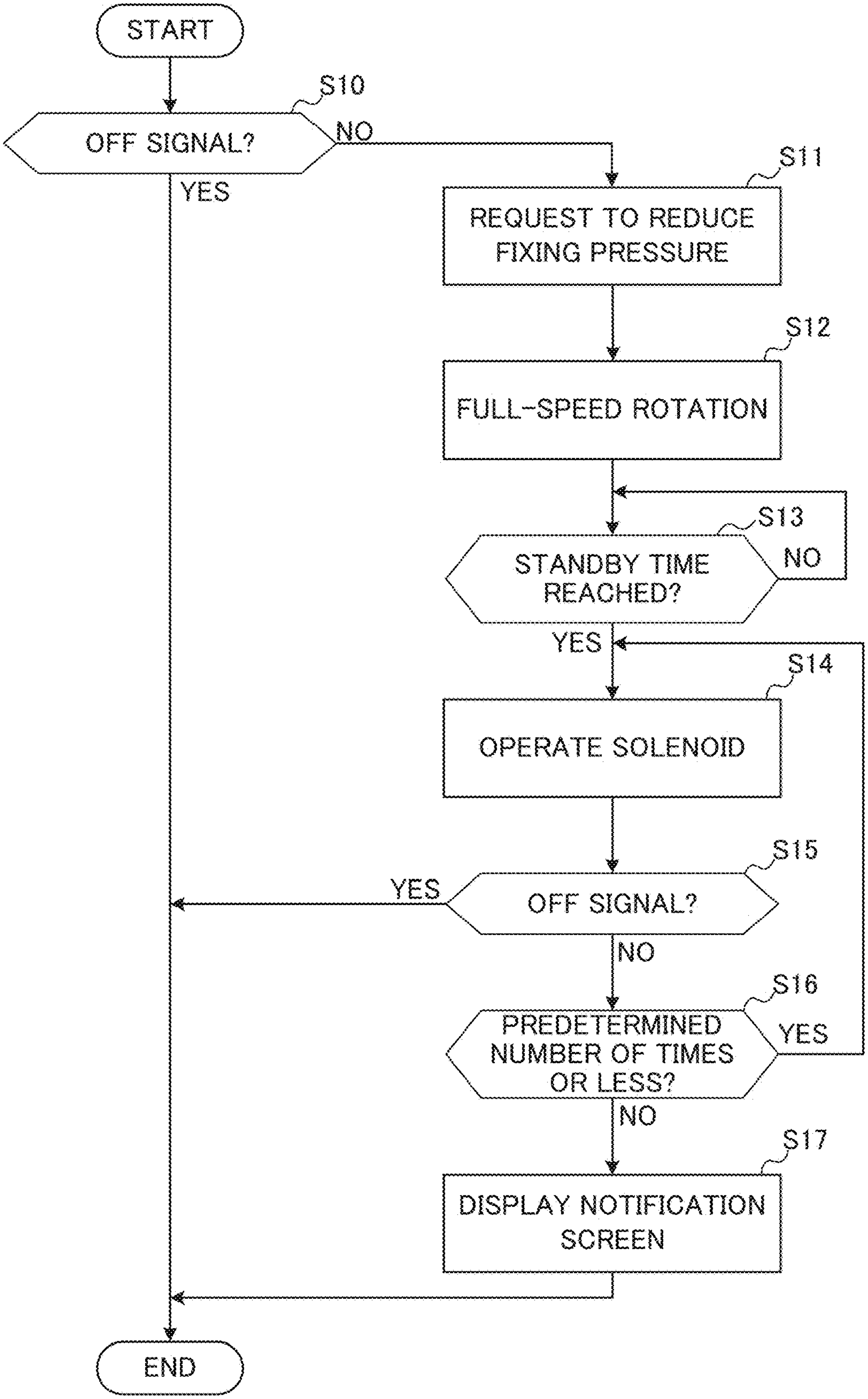
FIG. 6 is a flowchart showing an abnormality detection process.

FIG. 6 is a flowchart showing the abnormality detection process. Referring to FIG. 6, the operation of the image forming apparatus 1 for executing the abnormality detection process will be described in detail.

Upon receipt of an image forming instruction from the user, through the operation device 17, the controller 10 starts to execute the abnormality detection process specified in FIG. 6. First, the controller 10 decides whether the sensor 80 is outputting the OFF signal (step S10). When the sensor 80 is outputting the OFF signal (YES at step S10), the controller 10 finishes the abnormality detection process.

When the sensor 80 is outputting the ON signal (NO at step S10), the controller 10 instructs the fixing device 14 to reduce the fixing pressure. To be more specific, the controller 10 causes the fixing device 14 to reduce the pressing force of the pressing member against the fixing roller 142, thereby reducing the fixing pressure (step S11).

After step S11, the controller 10 causes the drive motor for driving the pressure roller 141 and the delivery roller 152 to rotate at full speed, with the heater of the fixing roller 142 turned off (step S12).

After step S12, the controller 10 starts counting the elapsed time after the start of the full-speed rotation, and repeatedly decides that a predetermined standby time (in this case, 350 msec) has not been reached, until the elapsed time reaches the predetermined standby time (NO at step S13).

When the elapsed time reaches the predetermined standby time (YES at step S13), the controller 10 stops the full-speed rotation, and operates the solenoid provided in the branch guide 40 in the reverse direction, for a period of time obtained by dividing the predetermined moving time (in this case, 120 msec) by a predetermined number of times (in this case, 3 times), in other words 40 msec (step S14).

Because of the operation of step S14, the branch guide 40 rotates clockwise about the rotation shaft 42, over a pre-specified distance (in this case, the distance obtained by dividing the distance corresponding to the travel from the second guide posture to the first guide posture, by the predetermined number of times). Accordingly, when the branch guide 40 assuming a posture close to the second guide posture is shifted to the first guide posture, the detection piece 66 of the lever 60 moves from the light-transmitting position to the light-shielding position, thereby causing the sensor 80 to output the OFF signal.

After step S14, the controller 10 decides whether the sensor 80 is outputting the OFF signal (step S15). When the sensor 80 is outputting the OFF signal (YES at step S15), the controller 10 finishes the abnormality detection process.

In contrast, when the sensor 80 is outputting the ON signal (NO at step S15), the controller 10 decides whether the number of operation times of the solenoid is equal to or less than the predetermined number of times (i.e., 3 times) (step S16). In this case, since the solenoid has been operated only once, the controller 10 decides that the number of operation times is less than the predetermined number of times (YES at step S16), and returns to step S14.

The controller 10 repeats the operation of step S14 to step S16, until the sensor 80 outputs the OFF signal, before the number of operation times of the solenoid reaches the predetermined number of times (YES at step S15), or until the number of operation times of the solenoid reaches the predetermined number of times (NO at step S16).

When the number of operation times of the solenoid reaches the predetermined number of times, the branch guide 40 moves to the position corresponding to the first guide posture, though the branch guide 40 was assuming the second guide posture, at the time that the abnormality detection process started.

When the number of operation times of the solenoid reaches the predetermined number of times (NO at step S16), while the sensor 80 is outputting the ON signal (NO at step S15), the controller 10 determines that the sensor 80 is outputting the ON signal not because of the posture of the branch guide 40, but because of the actuator 20 assuming the contacting posture, and causes the display device 16 to display the notification screen indicating that the sheet P is present on the first transport route 113 (step S17). After step S17, the controller 10 finishes the abnormality detection process.

To implement the aforementioned known technique, a sensor for detecting the sheet jam, and also a sensor for detecting whether the branch guide plate is located at the home position, are necessary. Since the image forming apparatus already includes many sensors to realize various functions, providing such additional sensors leads to an increase in manufacturing cost.

According to the foregoing embodiment, in contrast, the presence of the sheet P on the first transport route 113, and the posture of the branch guide 40 can both be detected, with the single sensor 80. Therefore, the number of sensors can be reduced, which leads to reduction in cost, compared with the case where the sensor for detecting the occurrence of sheet jam and the sensor for detecting the posture of the branch guide 40 are separately provided.

According to the embodiment, when the sensor 80 is outputting the ON signal, before the image forming by the image forming device 13, the controller 10 causes the branch guide 40 to shift the posture from the second guide posture to the first guide posture. Then, when the sensor 80 is still outputting the ON signal after the posture has been changed, the controller 10 causes the display device 16 to display the notification screen indicating that the sheet P is present on the first transport route 113.

Accordingly, it can be identified that it is because the sheet P is present on the first transport route 113, that the sensor 80 is outputting the ON signal before the image forming operation, and also the user can be made aware of such situation. As result, the user can easily eliminate the cause of the abnormality, for example by opening the cover of the image forming apparatus 1 and removing the sheet P on the first transport route 113.

According to the embodiment, further, the controller 10 keeps from causing the display device 16 to display the notification screen, when the sensor 80 outputs the OFF signal, after the posture of the branch guide 40 is changed.

Therefore, the notification screen can be prevented from being displayed in vain, when the sheet P is not present on the first transport route 113. In addition, in the case where the sensor outputs the ON signal before the image forming operation, because of the posture of the branch guide 40, the branch guide 40 is shifted to the first guide posture. As result, the cause of the abnormality can be automatically eliminated.

Other Variations

The disclosure may be modified in various manners, without limitation to the foregoing embodiment and the variations thereof. For example, although the image forming device 13 is configured to form an image on the sheet P according to the foregoing embodiment, the disclosure is not limited to such embodiment. The image forming device 12 may form an image on a different recording medium. Such different recording medium can be exemplified by an overhead projector (OHP) sheet.

Although the image forming apparatus 1 according to the disclosure is exemplified by the tandem-type color printer in the embodiment, the image forming apparatus 1 may instead be an electrophotographic image forming apparatus, a color multifunction peripheral, a monochrome multifunction peripheral, a copier, or a facsimile machine.

Further, the configurations and processings described in the foregoing embodiments with reference to FIG. 1 to FIG. 6 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:

an image forming device that forms an image on a sheet;

a fixing device that fixes the image onto the sheet;

a first transport route extending from the fixing device to a delivery port;

a second transport route branched from the first transport route, and extending toward the image forming device;

a branch guide that assumes a first guide posture, to guide the sheet to the first transport route, and assumes a second guide posture, to guide the sheet to the second transport route;

a sheet contact member that assumes a non-contact posture, when not in contact with the sheet on the first transport route, and assumes a contacting posture, when in contact with the sheet on the first transport route;

a detection object that assumes a first detection posture, when the branch guide assumes the first guide posture and the sheet contact member assumes the non-contact posture, and assumes a second detection posture, when the branch guide assumes the second guide posture, or when the branch guide assumes the first guide posture and the sheet contact member assumes the contacting posture; and a sensor that outputs a first signal, when the detection object is in the first detection posture, and outputs a second signal, when the detection object is in the second detection posture.

2. The image forming apparatus according to claim 1, further comprising:

a display device; and a control device including a processor, and configured to act, when the processor executes a computer program, as a controller that:

causes the branch guide to shift from the second guide posture to the first guide posture, when the sensor is outputting the second signal, before an image forming operation by the image forming device; and causes the display device to display a notification screen indicating that the sheet is present on the first transport route, when the sensor is still outputting the second signal, after the branch guide has shifted the posture.

3. The image forming apparatus according to claim 2, wherein, when the sensor outputs the first signal, after the branch guide has shifted the posture, the controller keeps from causing the display device to display the notification screen.

4. The image forming apparatus according to claim 1, wherein the detection object includes a rotation shaft, a contact piece, and a detection piece, the contact piece and the detection piece projecting from the rotation shaft in a direction orthogonal to an axial direction of the rotation shaft, but in different directions from each other, the detection object assumes the first detection posture in which an end portion of the branch guide is not in contact with the contact piece, when the branch guide is assuming the first guide posture, assumes the second detection posture in which the end portion of the branch guide is in contact with the contact piece, when the branch guide is assuming the second guide posture, assumes the first detection posture in which an end portion of the sheet contact member is in contact with the contact piece, when the sheet contact member is assuming the non-contact posture, and assumes the second detection posture in which the end portion of the sheet contact member presses the contact piece, when the sheet contact member assumes the contacting posture, and the sensor outputs the first signal, when the detection object is in the first detection posture and the detection piece is located at a predetermined position, and outputs the second signal, when the detection object is in the second detection posture and the detection piece is deviated from the predetermined position.

* * * * *